United States Patent [19]
Huges

[11] Patent Number: 5,405,067
[45] Date of Patent: Apr. 11, 1995

[54] HANGER HOLDERS AND METHODS OF FORMING THEM

[76] Inventor: Jack J. Huges, 6526 Clearbrook Dr., St. Helen, Mich. 48656

[21] Appl. No.: 23,895

[22] Filed: Feb. 26, 1993

[51] Int. Cl.⁶ .............................................. B60R 7/00
[52] U.S. Cl. .................. 224/42.45 A; 224/42.46 R; 224/313
[58] Field of Search ............... 224/42.45 R, 42.45 A, 224/42.46 R, 42.46 A, 313, 217, 218; 248/302, 303, 339; 211/119, 181; 294/142, 143, 137, 159

[56] References Cited

U.S. PATENT DOCUMENTS

| | | | |
|---|---|---|---|
| 3,194,457 | 7/1965 | Freilich | 211/119 X |
| 3,226,147 | 12/1965 | Marshall | 224/313 |
| 3,313,460 | 4/1967 | Hooker | 294/159 |
| 3,481,483 | 12/1969 | Harvey et al. | 224/313 |
| 3,584,772 | 6/1971 | Robertson . | |
| 3,592,431 | 7/1971 | Daidone | 248/302 |
| 4,238,062 | 12/1980 | Wheeler . | |
| 4,335,839 | 6/1982 | Kessler et al. | 294/142 |
| 4,466,652 | 2/1984 | Townsend | 294/142 |
| 4,824,156 | 4/1989 | Greene | 294/142 |
| 4,856,688 | 8/1989 | Ackermann | 224/217 |
| 5,104,083 | 4/1992 | Shannon | 248/339 |

Primary Examiner—Henry J. Recla
Assistant Examiner—David J. Walczak
Attorney, Agent, or Firm—Learman & McCulloch

[57] ABSTRACT

A closed, single loop holder is provided for clothes hangers hung on an upstanding hook on a vehicle interior side wall. The holder is formed with a crosspiece extending generally horizontally parallel to the side wall across the hook, a downwardly extending leg at one end of the crosspiece connecting to a clothes hanger support bar extending laterally outwardly relative to the side wall, and an upwardly and laterally angled leg connecting the bar with the opposite end of the crosspiece.

11 Claims, 2 Drawing Sheets

HANGER HOLDERS AND METHODS OF FORMING THEM

FIELD OF THE INVENTION

This invention relates to holders for increasing the capacity of automobile passenger compartment hooks.

BACKGROUND OF THE INVENTION

The normal hook unobtrusively provided in automobile passenger compartments for receiving garment hangers is generally less than one-half inch in length and normally is spaced outwardly from the vehicle wall a minimum distance generally less than one-half inch. Thus, it does not readily accommodate the more massive hooks of many garment bags and can accommodate only one or two metal hangers at a time. Typically, the plastic garment hangers finding increasing use today are of relatively larger cross-sectional diameter and such hooks are limited to receiving only a single plastic garment hanger. Accordingly, when vehicle trips of any substantial duration are undertaken, it is necessary to otherwise carry the substantial number of hangers for garments which may be required for one or more persons, such as by simply spreading them across the back seat of the vehicle, or placing them flatwise in the trunk. The back seat cannot be used in situations where it must be occupied by passengers and, when the garments are placed in a trunk, they tend to shift, become disarrayed, and wrinkle up.

A number of hanger holding devices have been proposed to extend the capacity of such vehicle hanger hooks, but they have been of a multi-part, or multi-loop nature, and more complex and expensive to manufacture and market than the hanger holder of the present invention.

SUMMARY OF THE INVENTION

The present invention provides a one-piece holder which can be readily hung on a vehicle passenger compartment hook and used to hold a plurality of hangers and garment bags. The device may be readily formed of galvanized steel rod or wire on the order of $\frac{1}{8}$th-3/16ths inches in diameter, or of plastic, or may be formed of steel wire and provided with a plastic outer coating or cover.

One of the prime objects of the present invention is to provide a relatively simple single closed loop holder which may be readily formed by, for example, bending a single piece of wire rod to the illustrated configuration, and then uniting a pair of abutting ends.

Another object of the invention is to provide a holder of the character described wherein the product, being essentially a one-piece, single loop device, does not have multiple parts which can become separated such that the holder cannot be used.

Still another object of the invention is to provide a single loop holder of the type described wherein the crosspiece which is received on the vehicle hook extends perpendicularly to the bar over which the garment hangers are hooked.

Still another object of the invention is to provide a one-piece holder which does not present part assembly problems.

Still another object of the invention is to provide a holder of the character mentioned which is extremely economical to manufacture and market to the extent that it may be used by companies as a promotional device which is provided complimentarily to customers, or can be used as an advertising handout at trade shows and the like.

Still a further object of the invention is to provide a one-piece device of the type mentioned which is functional and reliable, and sufficiently durable to withstand all but quite abnormal use.

Other objects and advantages of the invention will become apparent with reference to the accompanying drawings and the accompanying descriptive matter.

THE DRAWINGS

DETAILED DESCRIPTION OF THE SEVERAL EMBODIMENTS ILLUSTRATED

Figure 1:
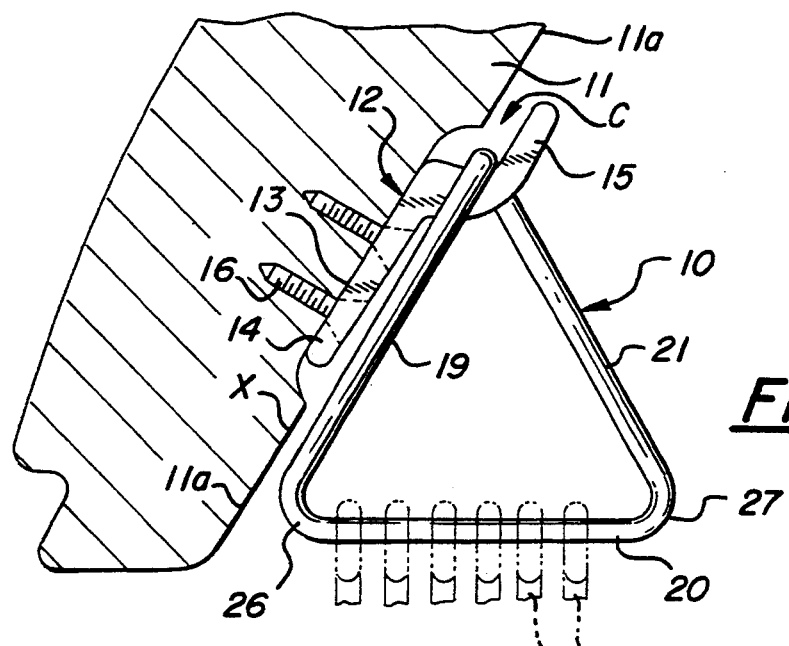
FIG. 1 is a sectional, side elevational view through a vehicle passenger compartment wall showing my novel holder mounted in position on the vehicle hook, the broken lines illustrating the hook portions of a number of garment hangers which have been hung on the carrying bar of the holder.

The one-piece hanger holding device generally designated 10, is shown in FIG. 1 as mounted on the side wall 11 of a vehicle passenger compartment C above, for instance, a rear door. Typically, the wall 11 which, for purposes of description I have termed the side wall, is the downwardly curved side edge of the roof of the vehicle, and is provided with an indentation 12 having a flatted portion 13 for receiving the base 14 of a hook 15. The base 14 is illustrated as secured to the wall 13 by suitable screws or other fastener devices 16 in the usual manner.

Typically the one-piece holder 10 may be formed from galvanized steel wire, which may be coated or painted with a non-marring oversurface. The holder generally designated 10, which is shown in FIG. 1 as supporting a number of garment hangers 17, comprises a singular loop which is bent or configured to provide a crosspiece generally designated 18 adapted to be received by the hook 15. A downwardly and angularly extending leg 19 extends downwardly from one end of the crosspiece, generally parallel to the interior wall surface 11a such as to be engageable with the surface 11a in the area of location x for holder stabilization purposes. The leg 19 leads to an elongate crossbar 20 which extends laterally out from wall 11 perpendicularly to the crosspiece 18. From the opposite end of the wire hanger carrying crossbar 20, an upwardly and laterally angled leg 21 connects to the opposite end of crosspiece 18.

Figure 3:
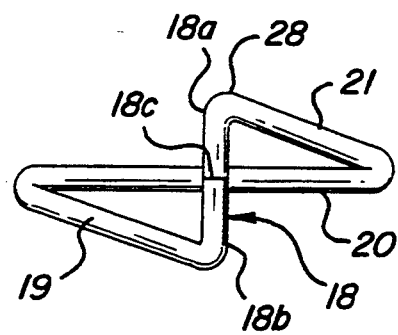
FIG. 3 is a top plan view of the holder only.

As FIG. 3 of the drawings particularly indicate, the crosspiece 18 may be formed of abutting ends 18a and 18b which are butt-welded at 18c so that the entire holder 10 can be formed from a single length of rod and comprises a closed, single loop structure.

Figure 4:
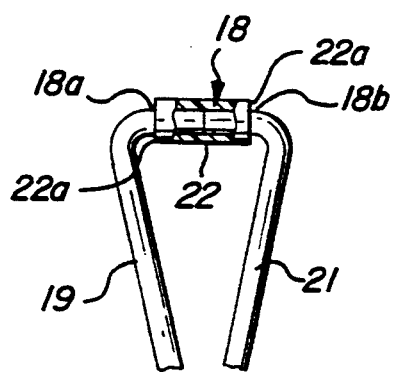
FIG. 4 is a fragmentary elevational view similar to FIG. 2, illustrating another method of securing the abutting ends which are integrated to provide a closed single loop structure.
Figure 5:
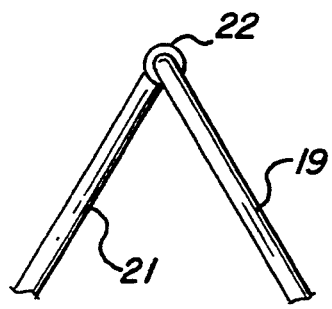
FIG. 5 is a fragmentary end elevational view thereof.

In FIGS. 4 and 5 an alternative method of securing the ends 18a and 18b is illustrated, wherein a metal sleeve 22 spans ends 18a and 18b and is welded to each as at 22a.

Figure 6:
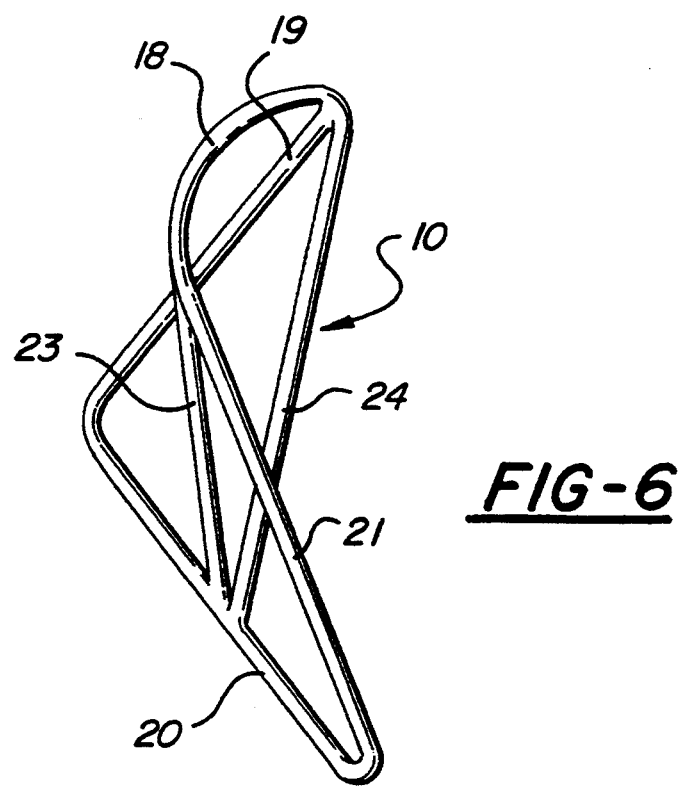
FIG. 6 is a perspective elevational view illustrating a modified holder which may be formed of a suitably rigid plastic.
Figure 7:
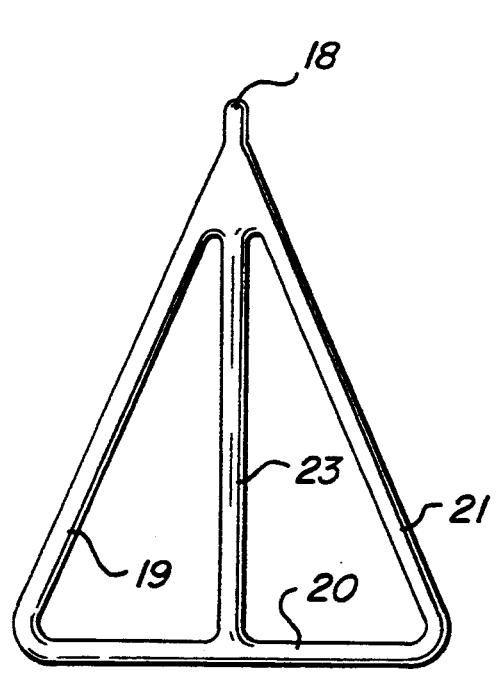
FIG. 7 is a end elevational view thereof.
Figure 8:
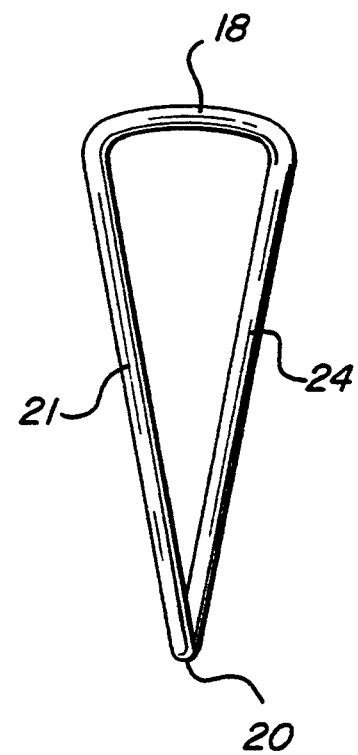
FIG. 8 is a front elevational view thereof.

In FIGS. 6-8 I have illustrated a still further embodiment of the invention which may be utilized when the holder is formed from a synthetic plastic material which is not as rigid as the galvanized wire or rod depicted in FIGS. 1-5. Such a holder may be, for instance, injection molded of a suitable plastic such as one of the polyolyfins i.e., polyethylene or polypropylene. In FIGS. 6-8 the identical numerals are used to describe the various sections of the holder 10, which they designate in FIGS. 1-5. The differences are that crosspiece 18 is shown as crowned. Of course, the version of the invention disclosed in FIGS. 1-3 could have been provided with an identically crowned crosspiece 18. In FIGS. 6-8, brace bars 23 and 24 may also be added, dependent upon the particular plastic material which is utilized. As disclosed, these brace bars are integrally molded to extend from the opposite ends of crosspiece 18 down to join with crossbar 20 intermediate its ends.

THE METHOD OF FORMING

Figure 2:
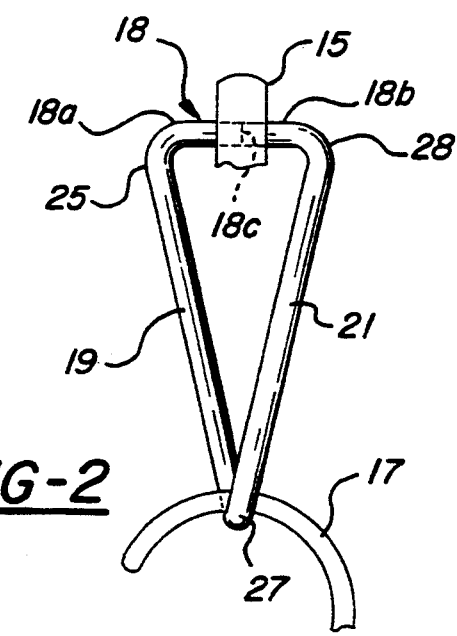
FIG. 2 is a front elevational view thereof, with the garment hangers illustrated in solid lines, but only fragmentarily.

The one-piece holder 10 disclosed in FIGS. 1-3 is formed by bending a single piece of wire stock from which the holder 10 is formed in a continuous manner, starting with the bend 25 while the end 18a is held, then making the bend 26 while the leg 19 is held, thence, while the bar 20 is held, making the bend 27, and finally, while the leg 21 is held, the bend 28 is effected so that the ends 18a and 18b are abutted. The ends 18a and 18b may then be integrated in the manner described in FIG. 1-3 or FIGS. 4 and 5. It should be understood that the ends which abut need not be in the crosspiece 18 and it is presently contemplated that abutting ends could also be joined to form the legs 19 or 21, or the crossbar 20.

The plastic version shown in FIG. 6-8, ideally, would be injection molded in quantity production to reduce their unit cost of production.

THE OPERATION

The holder 10 can function, also, as a carrier, once removed from the hook 15, to transport the hangers 17 to and from the passenger vehicle. When hung in position, as shown in FIG. 1, and with rocking of the vehicle as it rounds turns or proceeds over rough terrain, the leg 19, which parallels the interior wall surface 11a, can engage the wall surface at location x. This stabilizes the holder and effectually prevents it from being jarred off hook 15.

It is to be understood that the embodiments described are exemplary of various forms of the invention only, and that the invention is defined in the appended claims which contemplate various modifications within the spirit and scope of the invention.

I claim:

1. In combination with an upstanding hook for a vehicle interior side wall having an upstanding vertically extending hook spaced outwardly therefrom; a closed, single loop hanger for supporting a plurality of clothes hangers received on said hook, comprising:
    (a) a crosspiece having opposite ends and adapted to extend generally horizontally parallel to said side wall in a vertical plane across said hook;
    (b) a generally downwardly extending leg having opposite ends wherein one end of said leg is connected to one end of said crosspiece and adapted to extend generally parallel to said wall so as to be stabilizable thereby;
    (c) a clothes hanger support bar having opposite ends wherein one end of said bar is connected to the opposite end of said downwardly adapted to extend leg and extending generally horizontally laterally outwardly relative to said side wall and generally perpendicularly to said crosspiece; and
    (d) a generally upwardly extending leg having an end connected to the opposite end of said bar and an opposite end joined with the opposite end of said crosspiece.

2. The invention of claim 1 in which said hanger is configured from a continuous, single length of rigid rod stock with a pair of inwardly bent terminal ends in abutting relation, and means is provided for rigidly joining said abutting ends.

3. The invention of claim 2 in which said joining means comprises a sleeve spanning said ends.

4. The invention of claim 2 in which said legs and crossbar, from end configuration, form a triangle.

5. The invention of claim 4 in which said legs and crosspiece, in frontal configuration, form an inversely disposed triangle.

6. A closed, single loop holder for clothes hangers and garment bags adapted to be received on an upstanding hook on a vehicle interior side wall, comprising:
    (a) a crosspiece having opposite ends and extending in a first generally vertical plane;
    (b) a generally downwardly extending leg having opposite ends wherein one end of said leg is joined to one end of said crosspiece;
    (c) a generally horizontally extending clothes hanger support bar having opposite ends wherein one end of said bar is connected to the opposite end of said first leg and extending generally perpendicularly to said crosspiece; and
    (d) a generally upwardly extending leg having one end connected to the opposite end of said bar and an opposite end joined with said crosspiece.

7. The invention of claim 6 in which said holder is formed from a single length of rigid metal rod stock, and has a pair of inwardly bent terminal ends in abutting relation, and means is provided for joining said abutting ends.

8. The invention of claim 7 in which said joining means comprises a sleeve spanning said ends.

9. The invention of claim 6 in which said legs and crossbar, from the end, form a triangle.

10. The invention of claim 6 in which said legs and crosspiece, in frontal configuration, form an inversely disposed triangle.

11. The invention of claim 6 in which said legs, crosspiece, and bar in plan view form a figure-eight configuration.

* * * * *

UNITED STATES PATENT AND TRADEMARK OFFICE
CERTIFICATE OF CORRECTION

PATENT NO. : 5,405,067
DATED : April 11, 1995
INVENTOR(S) : Jack J. Hughes

It is certified that error appears in the above-indentified patent and that said Letters Patent is hereby corrected as shown below:

Title page, item [76] change inventor's name from "Huges" to read --Hughes--.

Signed and Sealed this

Twenty-fifth Day of July, 1995

Attest:

BRUCE LEHMAN

Attesting Officer     Commissioner of Patents and Trademarks